US 11,551,190 B1

United States Patent
Clements et al.

(10) Patent No.: US 11,551,190 B1
(45) Date of Patent: Jan. 10, 2023

(54) INSTANT NETWORK CASH TRANSFER AT POINT OF SALE

(71) Applicant: Wells Fargo Bank, N.A., San Francisco, CA (US)

(72) Inventors: Theresa Ann Clements, San Diego, CA (US); Daniel David, San Francisco, CA (US); Shane D. Eaton, Charlotte, NC (US); Albert Hwu, San Francisco, CA (US); Derek D. Mohr, Cornelius, NC (US); James C. Noe, Charlotte, NC (US); Jacob T. Orth, San Francisco, CA (US); Michelle E. Ziolkowski, Troy, OH (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/429,679

(22) Filed: Jun. 3, 2019

(51) Int. Cl.
G06Q 20/10 (2012.01)
G06Q 20/32 (2012.01)

(52) U.S. Cl.
CPC ......... G06Q 20/10 (2013.01); G06Q 20/3278 (2013.01)

(58) Field of Classification Search
CPC ...... G06Q 20/00; G06Q 20/12; G06Q 20/349; G06Q 40/00
USPC .......................................................... 705/35
See application file for complete search history.

(56) References Cited

U.S. PATENT DOCUMENTS

| | | | |
|---|---|---|---|
| 8,762,265 B2 | 6/2014 | Kessler et al. | |
| 9,111,266 B2 | 8/2015 | Kessler et al. | |
| 2009/0319409 A1 | 12/2009 | Omidyar | |
| 2009/0327010 A1 | 12/2009 | Vadhri | |
| 2010/0325048 A1* | 12/2010 | Carlson | G06Q 20/20 705/44 |
| 2010/0332386 A1 | 12/2010 | Vancini et al. | |
| 2011/0106601 A1 | 5/2011 | Perlman et al. | |
| 2012/0130887 A1* | 5/2012 | Meckling | G06Q 20/24 705/39 |
| 2013/0013509 A1 | 1/2013 | Perlman et al. | |
| 2013/0080323 A1 | 3/2013 | Scipioni | |
| 2013/0179336 A1 | 7/2013 | Lyons et al. | |
| 2013/0290176 A1 | 10/2013 | Tirumalashetty | |
| 2014/0058938 A1 | 2/2014 | Mcclung, III | |
| 2014/0089195 A1 | 3/2014 | Ward et al. | |
| 2014/0129433 A1 | 5/2014 | Rosenberger | |
| 2014/0201086 A1 | 7/2014 | Gadotti et al. | |

(Continued)

OTHER PUBLICATIONS

Alipay, Alipay Documentation Red Packet QR Code Introduction, printed on Sep. 30, 2019 at Internet address https://intl.alipay.com/doc/redpacket/scrzsv, 2 pages.

(Continued)

Primary Examiner — Kirsten S Apple
(74) Attorney, Agent, or Firm — Foley & Lardner LLP

(57) ABSTRACT

Point of sale (POS) devices, systems, and methods disclosed herein enable payments by merchants to non-customers, such as to employees of the merchant. A point of sale system of the merchant determines an amount of a payment to be made by the merchant to the employee. The point of sale system transmits payment instructions for executing the payment to a payment system provider computing system. The funds are made available in a bank account of the employee instantly or near instantly.

12 Claims, 7 Drawing Sheets

(56) References Cited

U.S. PATENT DOCUMENTS

| | | | |
|---|---|---|---|
| 2014/0279459 | A1 | 9/2014 | Weiss et al. |
| 2014/0365322 | A1* | 12/2014 | Phillips ............... G06Q 20/349 705/16 |
| 2015/0134514 | A1 | 5/2015 | Chan et al. |
| 2015/0193745 | A1* | 7/2015 | Handwerger .......... G06Q 20/20 705/39 |
| 2015/0254660 | A1 | 9/2015 | Allison et al. |
| 2015/0278816 | A1 | 10/2015 | Fleishman et al. |
| 2015/0333964 | A1 | 11/2015 | Wang et al. |
| 2015/0339671 | A1 | 11/2015 | Krietzman et al. |
| 2015/0371212 | A1 | 12/2015 | Giordano et al. |
| 2016/0071071 | A1 | 3/2016 | Lazay |
| 2016/0071097 | A1 | 3/2016 | Lazay |
| 2016/0071099 | A1 | 3/2016 | Lazay |
| 2016/0071109 | A1 | 3/2016 | Lazay |
| 2016/0071110 | A1 | 3/2016 | Lazay |
| 2016/0132884 | A1 | 5/2016 | Fridman et al. |
| 2016/0162882 | A1 | 6/2016 | Mcclung, III |
| 2016/0180305 | A1 | 6/2016 | Dresser et al. |
| 2017/0061438 | A1 | 3/2017 | Patel |
| 2017/0178110 | A1 | 6/2017 | Swanson et al. |
| 2017/0185989 | A1 | 6/2017 | Bozovich, Jr. |
| 2017/0357969 | A1 | 12/2017 | Huang et al. |
| 2018/0012203 | A1 | 1/2018 | Hall |
| 2018/0285836 | A1 | 10/2018 | Enobakhare |
| 2018/0374076 | A1 | 12/2018 | Wheeler |
| 2019/0108505 | A1 | 4/2019 | Perlman |
| 2019/0122222 | A1 | 4/2019 | Uechi |
| 2019/0236577 | A1 | 8/2019 | Schmid et al. |
| 2019/0280863 | A1 | 9/2019 | Meyer et al. |
| 2019/0385250 | A1* | 12/2019 | Bhattacharjee ........ G06Q 50/12 |
| 2020/0005277 | A1 | 1/2020 | Prabhu et al. |
| 2020/0034813 | A1 | 1/2020 | Calinog et al. |
| 2020/0175496 | A1 | 6/2020 | Finke et al. |
| 2021/0056552 | A1 | 2/2021 | Murray |

OTHER PUBLICATIONS

Alipay, Trust Makes It Simple, printed on Sep. 30, 2019 from Internet address https://intl.alipay.com/, 3 pages.

Bravo, Bravo Pay, CrunchBase, printed on Sep. 30, 2019 from Internet address https://www.crunchbase.eom/organization/bravo#section-overview, 9 pages.

Bravo, Tip or Pay Your Tour Guide Without Sharing Personal Info, printed on Sep. 30, 2019 from Internet address https://trybravo.com, 4 pages.

Bravo, Trybravo's Competitors, Revenue, Number of Employees, Funding and Acquisitions, printed from Internet address https://www.owler.com/company/trybravo on Sep. 30, 2019, 2 pages.

DipJar, printed on Sep. 30, 2019 from Internet address https://www.dipjar.com/, 10 pages.

LevelUp, Restaurant Customers Expect Seamless Digital Experiences, printed on Sep. 30, 2019 from Internet address https://www.thelevelup.com/, 4 pages.

Square, Inc., Grow Your Business Your Way With Square Tools, printed on Sep. 30, 2019 from Internet address https://squareup.com/us/en, 8 pages.

TSIP, Introducing Helping Heart—A Contactless Payment Jacket to Help the Homeless, dated Jul. 4, 2017, printed on Sep. 30, 2019 from Internet address https://www.tsip.co.uk/blog/2019/2/19/introducing-helping-heart-a-contactless-payment-jacket-to-help-the-homeless, 4 pages.

Uber, How Uber Works, printed on Sep. 30, 2019 from Internet address https://www.uber.com/us/en/about/how-does-uber-work/, 6 pages.

Wazeopedia, Main Page, printed on Sep. 30, 2019 from Internet address https://wazeopedia.waze.com/wiki/USA/Main_Page, 3 pages.

* cited by examiner

INSTANT NETWORK CASH TRANSFER AT POINT OF SALE

BACKGROUND

In many situations, customers at a point of sale of a retail establishment wish to tip an employee of the retail establishment. For example, at a restaurant or bar, customers may wish to tip the wait staff, the bartender or other employee. In such situations, the customer may be provided with a bill, which the customer may then pay with cash (e.g., paper currency and/or coins) or credit card (e.g., a physical credit card, or a credit card provisioned to a mobile wallet application installed on a mobile device, such as a smart phone, etc.). When paying with cash, the customer may tip the employee by leaving additional cash in excess of the amount of the bill. When paying with credit card, the customer may write in an additional tip amount that is in excess of the amount of the bill. The total amount charged to the credit card is then the amount of the bill plus the tip. Many retail establishments will calculate the aggregate amount of credit card tips received by employees during a shift, and then pay the employee the aggregated tip amount in cash at the end of the employee's shift. This provides an immediate reward to the servers for high quality service provided to customers.

Most people prefer not to carry around large amounts of cash. Hence, for some retail establishments, the vast majority of people pay with credit card and not cash. As a result, such retail establishments may not have enough cash on hand to pay employees their credit card tips at the end of their shifts using only the cash received from cash-paying customers during that shift. Instead, such retail establishments need to send an employee to a branch location of a bank to get cash to pay the tips of employees. Given that bank branch locations typically are not open late at night and have limited weekend hours, this in turn requires retail establishments to obtain significant amounts of cash in advance and to store that cash in a secure location (e.g., an on-premises safe). A possible solution to this problem would be to include the aggregated tip amount in the employee's paycheck. However, as compared to paying in cash at the end of the shift, this approach does not provide the same immediate reward to the employees for high quality service provided to customers.

Other situations also exist where there is need for a retail establishment to provide cash to an individual at a point of sale terminal. For example, some stores sell used goods (e.g., used books) and use cash to purchase such goods from their original owners. As another example, consignment stores sell second hand goods. When a good sells, a percentage of the sale price is typically owed to the original owner of the good. Such entities could benefit from improved payment mechanisms as well.

SUMMARY

According to various example embodiments, point of sale (POS) devices, systems, and methods disclosed herein enable payments by merchants to non-customers, such as to employees of the merchant. A point of sale system of the merchant determines an amount of a payment to be made by the merchant to the employee. The point of sale system transmits payment instructions for executing the payment to a payment system provider computing system. The funds are made available in a bank account of the employee instantly or near instantly.

According to various example embodiments, a point of sale instant payment system comprises a point of sale device and a payment system provider computer system. The point of sale device may include an input/out devices such as a touch screen display and a payment card reader. At the end of service to the customer by an employee, the payment card reader interacts with a credit card of the customer to initiate a credit card payment to the merchant. The payment services computer system is configured to transmit a payment to the employee that includes a tip amount. The payment system provider computer system maintains an account for the merchant. The account of the merchant is the source of funds for the payment. The funds are made available to the employee instantly or near-instantly, rather than the employee having to wait until a next paycheck.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
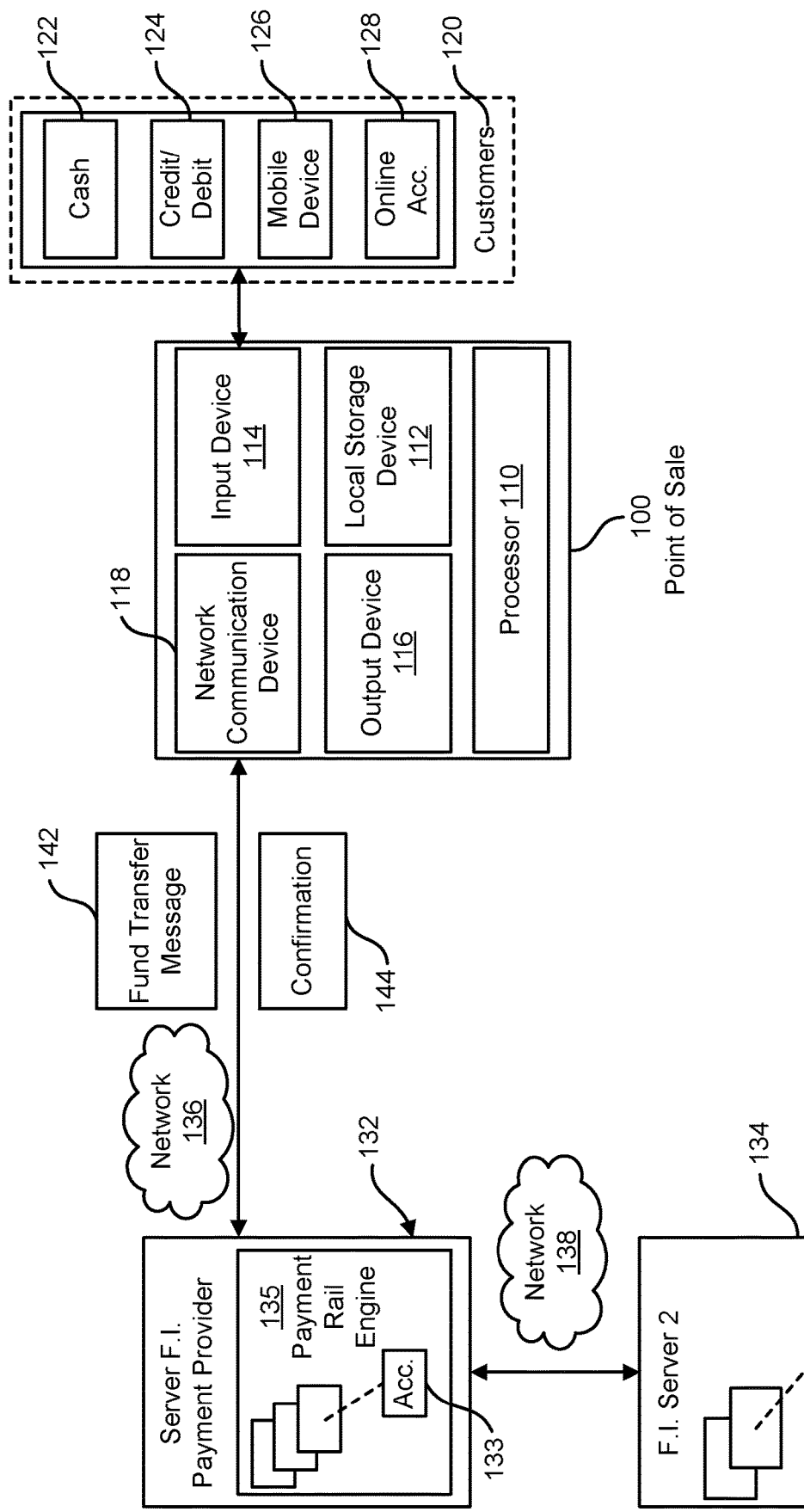
FIG. 1 is a block diagram of an example POS instant network cash transfer system.

Referring generally to the figures, instant network cash transfer POS systems and methods, according to one or more example embodiments, are shown. As will be described, instant network cash transfer POS systems and methods may include at least one payment system provider (e.g., a financial institution) connected to at least one POS device via a communication network (e.g., the internet). The POS device may be owned by an owner of a retail establishment and operated by an employee or customers for payment transactions between the customers and the owner. For purposes of providing an example, the instant network cash transfer POS systems and methods are described in the context of a restaurant setting. As will be appreciated, however, the instant network cash transfer POS systems and methods may be used in other contexts as well.

When payments are received via credit card, a portion of the payment transaction may be immediately directed to the employee in the form of a cash deposit in the employee's bank account (e.g., at the end of a shift, when a particular credit card transaction is approved by the credit card issuer, or at another time). Advantageously, instant network cash transfer POS systems and methods allow the owner to efficiently manage vast credit card payments including tips or similar payments to the employee in various settings. For example, a restaurant may avoid making trips to a bank branch to obtain cash (e.g., paper currency and coins) and may instead instantly transfer tips to its employees using the instant network cash transfer POS system. Such instant payment benefits the employees as well because it provides instant settlement of tips from the retail establishment, even in situations where the tips were originally made via credit card.

The embodiments of the instant network cash transfer POS systems and methods described herein improve computer-related technology by performing certain steps that cannot be performed by conventional computing systems or human actors. A payment system provider may be configured to determine one among many payment rails to complete the payment operation, based on, for example, different transfer speeds, costs involved, and established user preferences. The POS device is operable to intake mixed forms of payments, including cash, debit cards, credit cards, and is operable to may payments to various employees at night.

Advantageously, the embodiments of the instant network cash transfer POS systems and methods described herein allow an employer to instantly transfer cash payments without obtaining cash (e.g., paper currency and/or coins) at a retail bank branch location. The POS systems can also manage mixed cash and credit payments to employees, who may have multiple, overlapping shifts by initiating and confirming instant cash transfer according to a programmed schedule or occurring automatically triggered by certain events. The funds associated with such payments may then be made immediately available to the employee. For example, the employee may have access to the funds via a debit card associated with the account into which the funds were deposited, such that the employee may spend the funds after the employee's shift ends rather than waiting for the funds to arrive via a separate paycheck. In some embodiments, the funds may be made immediately available via a mobile wallet application installed on a mobile device of the employee. In some embodiments, such an arrangement allows employees to avoid carrying around significant amounts of cash late at night (e.g., if the employee works until after closing of a bar or restaurant and is then responsible for cleanup tasks).

As another advantage, in some embodiments, the disclosed POS systems may allow for automatic payment rail selection by the payment system provider. The disclosed payment system provider is operable to offer multiple payment rails or internal, zero cost transfers and determine an optimal payment rail using internal logic. For example, the disclosed payment system provider may include a payment rail engine, which includes an internal logic receiving a payment request from a merchant or merchant POS provider. The payment rail engine is operable to identify the optimal payment rail based on certain pre-set preferences or default settings, and initiate the payment using the identified optimal payment rail. The payment rail engine may compare multiple payment rail options, including, for example, Debit "push to card," ACH batch payment, Zelle network transfer, Paypal/Venmo integration, "on-us" transfer between internal accounts of the payment system provider, among others. The internal logic may include, for example, cost comparison, preferences of the account holder or the payment system provider, and speed of settlement, among other factors. In some embodiments, the payment rail may be selected by the recipient/employee.

Referring now to FIG. 1, FIG. 1 is a block diagram of an example POS instant network cash transfer system including one or more POS devices 100 (e.g., point of sale computer terminals), one or more customers 120, and a payment system provider 132 (e.g., computer servers of a financial institution). The POS devices 100 may be connected to the payment system provider 132 via network 136 to permit sending fund transfer messages 142 and receiving fund transfer confirmations 144. The payment system provider 132 may be connected to another payment system provider 134 (i.e., computer servers of another financial institution associated with the employee) via network 138 to permit conducting transactions with accounts outside of the payment system provider 132. Although the network 138 is illustrated independent of the network 136, a common network (e.g., the internet) may be used for the communication.

The POS device 100 may be a property of a merchant, operated by an employee of the merchant, and receive input from a customer 120 of the merchant. In some embodiments, the POS device 100 may receive physical input from the customer 120, such as in the form of input at a touchscreen or other input device. In such examples, the POS device 100 may be a tabletop touchscreen device. In other embodiments, the POS device 100 may receive wireless (e.g., NFC) communication from the customer 120, e.g., a credit card "tap" payment. In yet some other embodiments, the POS device 100 may receive an input from an employee, such as a waiter or a waitress for the customer 120 in a restaurant setting. In some embodiments, rather than be a single stand-alone device, the POS device 100 may comprise a plurality of computer terminals and one or more computer servers connected via a local area network.

In some embodiments, an employee of the merchant that owns the POS device 100 may register an account for receiving instant cash payments with the POS device 100. Similarly, in some embodiments, in order to expedite repeated transactions, the customer 120 may authorize registration of an account at the payment system provider 132 to the POS device 100 (e.g., an individual who routinely brings items to a consignment shop).

The POS device 100 includes at least a processor 110, a local storage device 112, an input device 114, an output device 116, and a network communication device 118. The processor 110 includes one or more circuits communicatively coupled to one or more memory or memory devices such as the local storage device 12 for processing, executing, or running programs or applications. The processor 110 may be operable to record and process cash transactions separate from and associated with the executable fund transfer message 142, such as tracking cash received at a cash register drawer of the POS device 100. In some embodiments, the one or more processors 110 may execute instructions stored in the memory or may execute instructions otherwise accessible to the one or more processors 110. In other embodiments, the one or more processors 110 may be embodied in various ways.

The input device 114 may include any type of input device including, but not limited to, a touchscreen, an optical barcode scanner, a radio receiver (e.g., to read NFC-enabled payment cards), a microphone, a touch pad, a keyboard, a keypad, a mouse, or other input devices.

The output device 116 may include any type of output device including, but not limited to, a speaker, a computer display or monitor (including an LCD, LED, or a touchscreen), a printer, or other output devices performing the function of emitting a human perceptible signal. In other embodiments, the output device 116 may include a device capable of performing the function of emitting a signal that is not human perceptible, such as a radio transmitter (for interacting with an NFC-enabled payment card).

The network communication device 118 may include components described herein and/or additional components that allow and/or facilitate connectivity to the network 136. In some embodiments, data that passes through the network communication device 118 is cryptographically protected (e.g., encrypted), for example, by a secure communication module of the network communication device 118. In some embodiments, data passing through the network communication device 118 is tokenized such that sensitive data (for example, account number(s), user location, personally identifiable information, and the like) is obscured for transmission within or outside the computing environment. Various communication protocols can be used, including, for example, any of the Internet protocol (IP), transmission control protocol (TCP), hypertext transfer protocol (http), simple object access protocol (SOAP), file transfer protocol (FTP), etc. In some embodiments, secure versions of conventional internet protocols may be used to exchange data via the network communication device 118 (and corresponding communication devices at the payment system providers 132 and 134), such as IPsec, https://, etc.

The networks 136 and 138 each comprise a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments or combinations, the networks 136 and 138 include a local area network or a wide area network. In some embodiments, the networks 136 and 138 may include the internet. Data, messages, packages, etc. may be transferred over the networks 136 and 138, through network communication device 118, using, for example, an application programming interface (API). In some embodiments, some or all functions of the API can be stored in a storage media that is communicatively coupled but not local to the respective system, such as cloud-based storage. Thus, the functions of the API can be executed by or on each respective computing environment.

The payment system provider 132 may include computer-implemented logic to track one or more accounts 133 and to implement a payment rail engine 135. The payment system provider 132 includes, though not illustrated, computer servers for performing transactions in response to payment requests included in one or more fund transfer messages 142 sent from the POS device 100. The accounts 133 may include one or more accounts associated with the customers 120, the owner of the POS device 100, and/or the employees of the owner. Other accounts may also be held at other financial institutions, as indicated by payment system provider 134. In other words, upon receiving the fund transfer message 142, the payment system provider 132 may transfer funds from one of the accounts 133 (e.g., an account held by the owner) to another one of the accounts 133 (e.g., an account held by an employee at the same financial institution) or to another account managed by the payment system provider 134 (e.g., an account held by an employee at a different financial institution).

In general, one or more electronic circuit(s) of the POS device 100 and the payment system provider 132 and 134 may be implemented as software code suitable for compilation, object code, executable file(s) and/or code, a set of machine language instructions, and/or in another suitable form for carrying out the computer-implemented method(s) described herein. In some embodiments, the one or more electronic circuit(s) may be implemented in a distributed fashion such that at least some of the code is executed and/or compiled on a system that is different from the system hosting the code, executable files, etc.

According to various embodiments, the functionality provided by the circuits of the POS device 100 can be made accessible to the POS device 100 and/or payment system providers 132 and 134 as a fully or partially installed application including executable code packages and the like. Alternatively, these electronic circuits may be deployed to client devices (e.g. of customers 120, etc.) in a "light" fashion such that no installation is required. For example, functionality provided by the circuits can be made accessible to the customers 120 through a web browser, a browser plug-in with navigable controls, an applet, a virtual application hosted externally to the POS device 100 or payment system provider 132 and deployed in a software-as-a-service mode, etc. As another example, the functionality may be programmed into the POS device 100 by the manufacturer of the POS device 100.

In some embodiments, the POS device 100 can be implemented as a tablet, phone or other device that is sold with basic POS software functionality and that includes the ability to download applications ("apps") to provide the POS device 100 with additional functionlality. In such embodiments, the instant network cash transfer POS systems and methods described herein may be implemented in part by providing a downloadable app that can receive as input the aggregate tip amount owed to the employee and that includes program logic to generate the fund transfer messages 142. The downloadable app may interact with an application programming interface (API) operated by the payment system provider 132. In such an example, the application programming interface (API) operated by the payment system provider 132 may be configured to expose a set of services to the downloadable app that allows payments to be triggered on different payment rails depending on the specific parameters of the message sent to the API. In other embodiments, the downloadable app may be more tightly integrated with the POS software such that the tip payment may be forwarded to the employee immediately after a particular credit card transaction is approved by the credit card issuer.

The customers 120 may provide payments to the POS device 100 in various forms. For example, the customers 120 may provide payments to the POS device 100 in the form of cash 122, with a physical credit card or debit card 124, with a credit card or debit card provisioned to a mobile device 126 (e.g., executing Apple Pay, Samsung Pay, or other digital wallet), by using online transfer from an online account 128 (e.g., prepaying for an order via a merchant's website), or in another manner. The payments submitted from the customers 120 to the POS device 100 are processed by the processor 110 to generate one or more results. For example, in some embodiments, the POS device 100 may be configured to track non-cash tips paid to an employee over the course of a shift and compute an aggregate tip amount ($X). In some embodiments, the non-cash tips may be manually tracked. In embodiments where implementation involves a downloadable app, an aggregated tip amount may be entered into the downloadable app, or tips may be automatically forwarded to the employee each time a credit/debit card transaction is approved.

The processor 110 may then generate a fund transfer message 142 and transmit the message 142 to the payment system provider 132. The fund transfer message 142 may cause the payment system provider 132 to debit an account of the merchant associated with the POS device 100 by $X and to initiate a transfer of the $X to the employee for whom those tips were received. The transfer may thus be completed, for example, immediately or at the end of the server's shift, rather than the server waiting to receive the funds as part of their next paycheck. Depending on the payment rail utilized, in some embodiments, the transfer to the server may be made nearly instantaneously. Upon receiving the executable fund transfer message 142, the payment system provider 132 completes the fund transfer and returns a confirmation 144 (i.e., a completion notification) of the fund transfer request to the POS device 100. The POS device 100 may then show or otherwise communicate the confirmation 144 using the output device 116. During operation, the one or more results, the fund transfer message 142, and the confirmation 144, or a copy/record thereof may be saved in the local storage device 112.

By way of a specific example, as previously indicated, the merchant may for example be a restaurant and the employee may be a waiter or waitress. The POS device 100 may be operated by a waiter or a waitress of the restaurant, or by a customer 120 that orders directly from the POS device 100 (e.g., a tabletop device) and receives service from the waiter or waitress. In some embodiments, as previously noted, the POS device 100 may comprise a larger system (e.g., multiple terminals interconnected via a LAN and one or more backend servers). When the waiter or waitress is assigned to serve a particular table (i.e., customer), the POS device 100 may track such assignments, and may further track tips received by the waiter or waitress from various customers they have served. For example, the processor 110 can initiate an instant fund transfer at the end of the stored work schedule so that the particular waiter or waitress receives an instant cash payment at the end of his or her shift.

In some embodiments, the POS device 100 allows the customer 120 to operate and checkout by himself or herself (e.g., a tabletop device). In such situation, the POS device 100 may be provided at each service location of a service provider, such as each table of the restaurant. The output device 116 may provide interactive information when the input device 114 receives input from the customer 120. In some embodiments, the output device 116 may include suggested tips to the customer 120.

Figure 2:
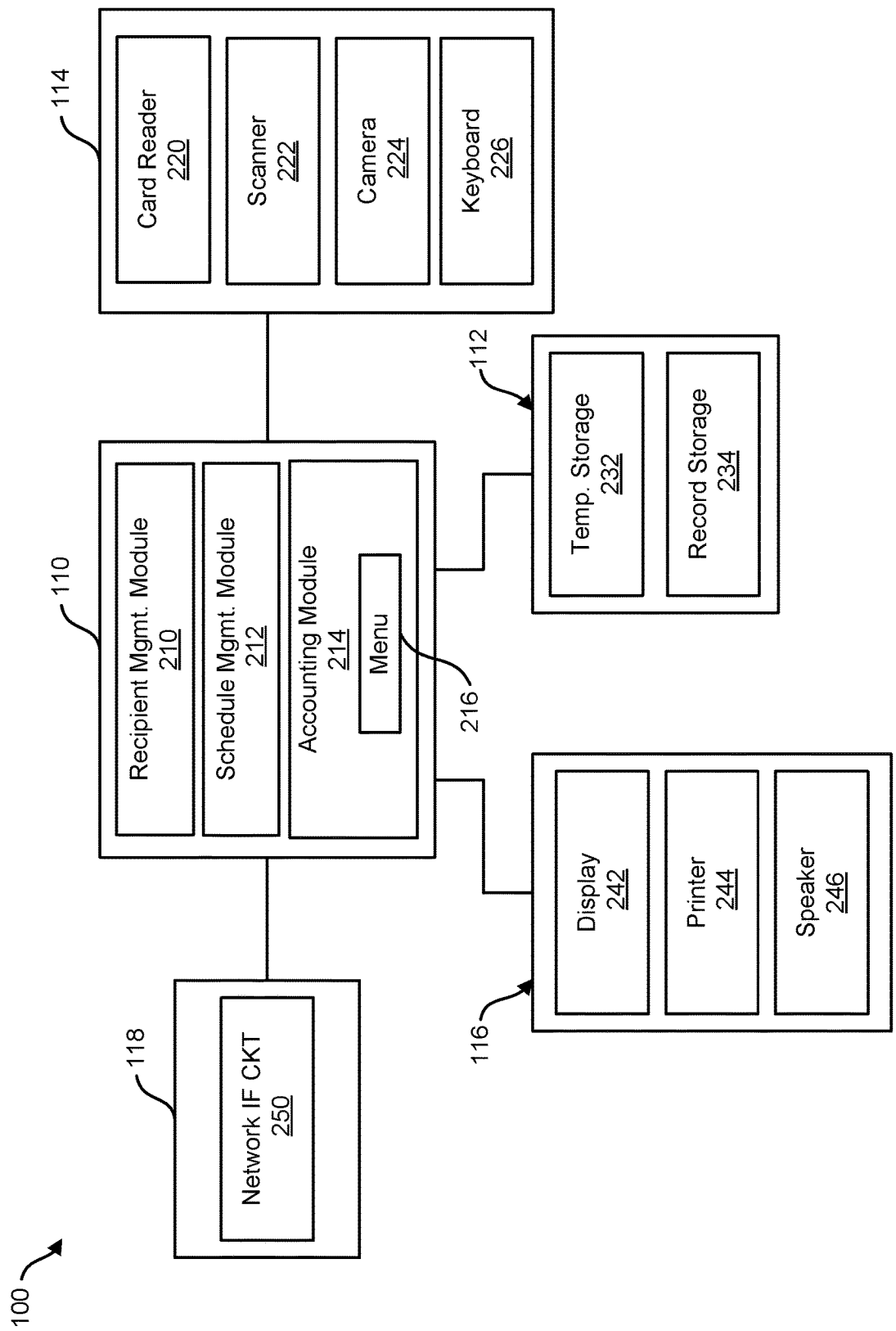
FIG. 2 is a diagram showing a POS instant network cash transfer device.

Referring now to FIG. 2, FIG. 2 is a diagram showing the detailed components of the POS device 100. The POS device 100, as shown in FIG. 1, includes at least the processor 110, the local storage device 112, the input device 114, the output device 116, and the network communication device 118. Further in these components, the processor 110 includes a recipient management module 210, a schedule management module 212, and an accounting module 214. The accounting module 214 further includes menu listing 216. The local storage device 112 includes a temporary storage 232 and a record storage 234. The input device 114 includes at least a card reader 220, a scanner 222, a camera 224, and keyboard 226. The output device 116 includes a display 242, a printer 244, and a speaker 246. The network communication device 118 includes a network interface circuit 250.

In the processor 110, the recipient management module 210 receives, records, and processes information associated with the customers 120. For example, the account information may include arrival time, responsible payor, responsible server, and other information related to payment. The schedule management module 212 includes schedule information relating to employees to facilitate computation of aggregate tip amounts. The accounting module 214 executes various data processing to determine values for each payment transactions. For example, the accounting module 214 includes the menu listing 216 to facilitate computation of the amount owed by the customer (e.g., without a tip). During operation in some embodiments, the accounting module 214 is operable to calculate one or more results corresponding to a particular customer, in a particular time frame, or for a particular server. For example, the accounting module 214 is operable to process a sum of tips for a current shift of a server, so that such amount may be provided to a downloadable app which then initiates payment of the aggregate tip amount to the server via interaction with the payment service provider 132.

The input devices 114 receive various identification/account information from the customer 120. The card reader 220 may read an integrated chip and/or a magnetic strip of a credit card, a debit card, or the like. The scanner 222 may read a barcode of one or more dimensions, sense a signal related to a digital wallet (e.g., a QR code displayed on a screen of a mobile device), or other information. The camera 224 may receive input of visual information to obtain additional information about the customer (e.g., a picture of the customer's drivers license), for example, in embodiments where it is necessary to authenticate the customer. The keyboard 226 may include a virtual keyboard operable on a mouse, a touchscreen, or a touchpad, a laser keyboard having a laser emitter and receiver for determining key actuations, and/or a mechanical keyboard registering a compression of a stroke. In some embodiments, the input device 114 includes two or more of the components 220, 222, 224, and 226. For example, the input device 114 may include the keyboard 226 and a cord connected scanner 222 or a Wi-Fi connected camera 224. In some embodiments, the input device 114 may include all of the components 220, 222, 224, and 226.

The output device 116 is operable to allow a user to verify the input information received at the input device 114 and notify the user of a confirmation of the payment completion. The display 242 presents visual information. The printer 244 may print receipts or other record information for customers 120 to sign or take away. The speaker 246 may provide a voice or sound signal indicating an input or the confirmation 144 or both. In some embodiments, the output device 116 includes other types of outputs, such as a secondary display/monitor, a card puncher for marking rewards cards, and other similar output devices.

The network interface circuit 250 of the network communication device 118 may be a network interface controller, a network interface card, a network adapter, a LAN adapter, or the like. In some embodiments, the network interface circuit 250 is an Ethernet network controller. In other embodiments, the network interface circuit 250 is a wireless network adaptor or a cellular network adaptor. Although the network interface circuit 250 is expressly illustrated in the POS device 100, the payment system providers 132 and 134 may also include a functionally equivalent network communication device for connecting to the network 136 and 138. In some embodiments, one or more devices of the customer 120 may also be connected to the network 136 to communicate with the POS device 100 via the network communication device 118.

Figure 3:
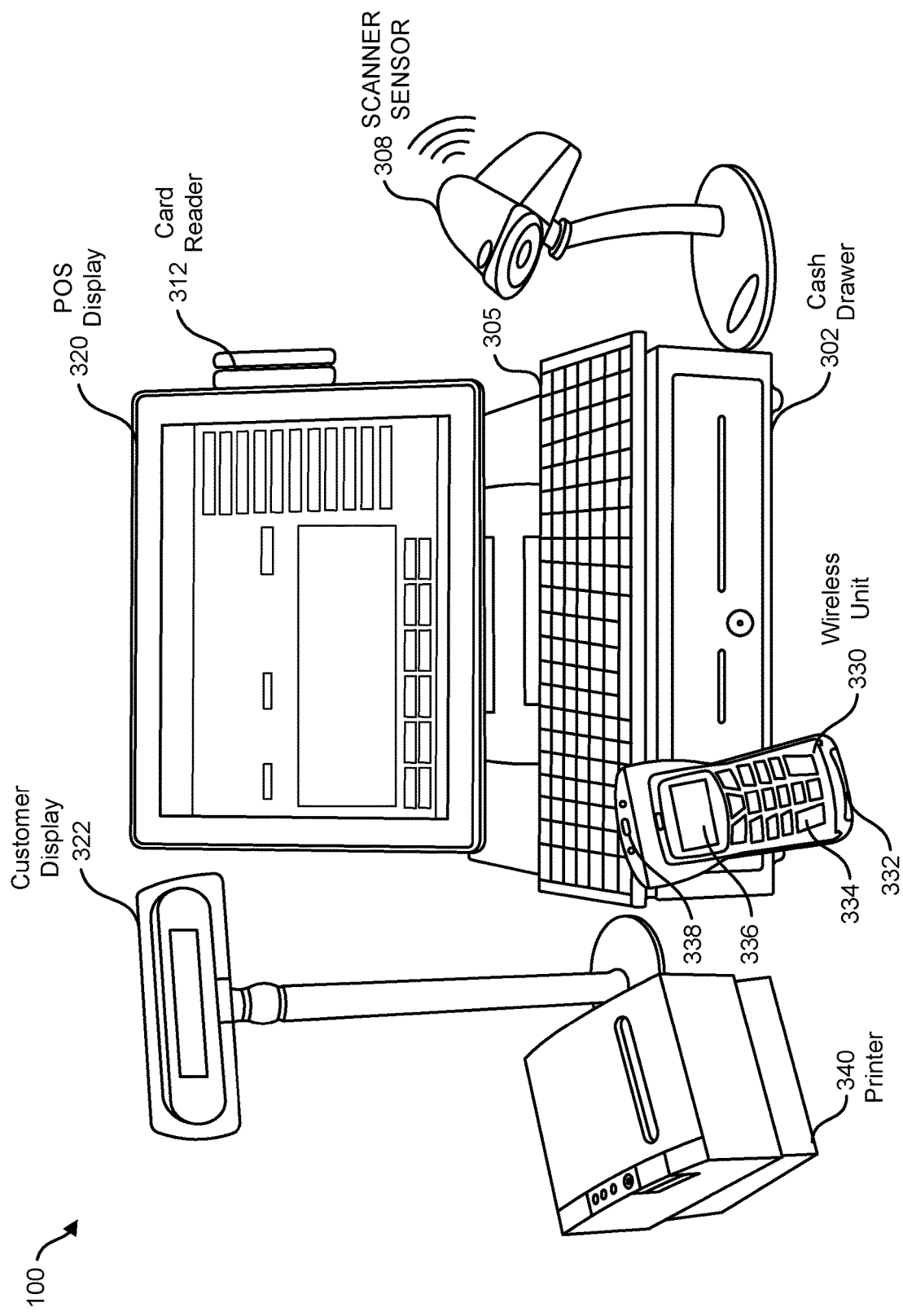
FIG. 3 is an example POS instant network cash transfer device.

Referring now to FIG. 3, FIG. 3 is an example POS device 100 having example components. As shown, the POS device 100 includes a desktop unit having a POS display 320 and a main keyboard 305. The keyboard 305 may be used by an employee of the owner of the POS device 100 to input ordering information. A card reader 312 may be attached onto the POS display 320 for reading debit and/or credit card information. A cash drawer 302 may be located below the keyboard 305 for storing cash notes and/or changes. Although not shown in FIG. 3, the POS device 100 includes a special purpose computer system (as discussed in FIGS. 1-2) connected with the POS display 320, the card reader 312, and the keyboard 305. For example, the computer system may share a common casing with the cash drawer 302, or share a common casing with the POS display 320, or be embodied as an external unit.

The POS device 100 may further include a wireless unit 330 as a portable and/or miniaturized version. The wireless unit 330 may also include a chip card reader 332 for reading integrated circuit chips of debit or credit cards. The wireless unit 330 may further include a keypad 334, a display 336 and a card reader 338 for reading magnetic strips of debit or credit cards. The wireless unit 330 may further include sensors and/or network adaptors for accepting digital payment such as Apple Pay.

The POS device 100 may also include a scanner 308 for scanning barcodes or sensing optical or digital payments. In some embodiments, the scanner 308 is operable to scan paper barcodes in one or more dimensions. In other embodiments, the scanner 308 is operable to scan digital barcodes in one or more dimensions, such as ones displayed on a screen of a smartphone or a tablet computer or the like. In some embodiments, the scanner 308 is operable to communicate with RFID tagged objects. In other embodiments, the scanner 308 is operable to communicate with electronic devices to receive payments from digital wallets such as Apple Pay, Samsung Pay, etc.

In some embodiments, the POS device 100 further includes a customer display 322 facing toward customers for showing information to be included in the final receipt. In some embodiments, the POS device 100 may also include a printer 340 for printing payment records, such as a merchant copy and a customer copy in a restaurant setting, for example. The customer display 322 and the printer 340 are examples of the output device 116 as shown in FIGS. 1 and 2, other implementations are possible.

Figure 4:
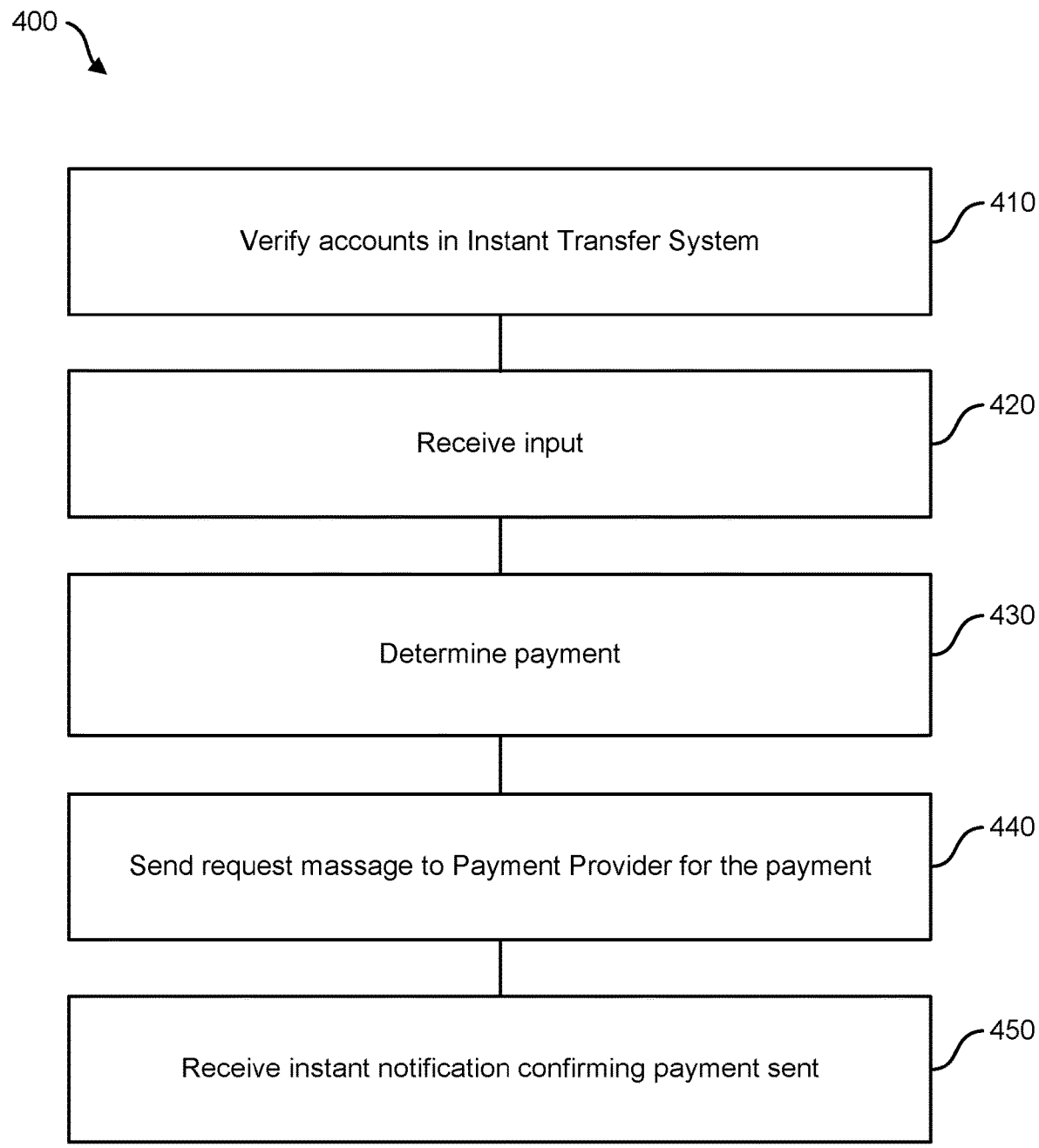
FIG. 4 is a flow chart illustrating operations performed in the POS instant network cash transfer device.

Referring now to FIG. 4, FIG. 4 is a flow chart 400 illustrating operations performed at the POS device 100. The operations performed at the POS device 100 enables a method for an instant cash transfer between the owner of the POS device 100 and one of the owner's employees for payments received from the customers 120. Because the POS device 100 is owned by the owner, the POS device 100 has been configured to be associated with a financial account of the owner, such as one held in the payment system provider 132 (operation 410). For example, as part of the POS device 100 or specific software downloaded into the POS device 100, the employer may enter account information as part of configuring such software.

As a further initial setup step, as will be appreciated, employees may be allowed to register to participate in the instant network cash transfer system. For example, the employee may provide bank account information for an account where the employee wishes the funds to be deposited (for example, a bank routing number and checking account number). In some embodiments, the employer and/or the payment service provider may determine the payment rail used to transfer money to the employee. In other embodiments, the employee may determine the payment rail. For example, the employee may wish to receive payments via a third party payment service (e.g., Zelle or Venmo). In such a scenario, the employee may provide the employee's account handle (e.g., cell phone number, email address) for the selected service. In some embodiments, once the account information has been provided, a verification step is performed to ensure accuracy of the account information (e.g., a microdeposit is sent to the employee's account). In some embodiments (e.g., where actual bank account numbers are provided instead of a Zelle or Venmo handle), the employee's account information is stored at the payment system provider 132 and not at the POS device 100, such that the employee's account information is not compromised in the event the POS device 100 is compromised.

At step 420, the POS device 100 receives input from the user (e.g., either an employee or a customer as described above). For example, the input may include an order entered by the employee, credit card information of the customer, or a request for a final invoice of existing orders. In a restaurant setting, the input received at step 420 may include customer information and corresponding menu items ordered by the customer, so that such information may be included on the final bill. As another example, in the context of a tabletop POS device 100, the POS device 100 may take the order from the customer, transmit the order to the kitchen for meal preparation, keep track of any additional items ordered during the course of the meal, receive an input indicating that the customer wishes to checkout, display suggested tip amounts, receive a selection of one of the suggested tip amounts, and then receive payment from the customer (e.g., a credit card tap).

At step 430, the POS device 100 determines a cash payment from the owner to the employee in payment of one or more tips. The POS device 100 may determine the tip amount based on the total amount paid less the amount of the original bill. As previously indicated, in some embodiments, tips are paid to the employee each time a credit card transaction is approved. In other embodiments, tips are paid to the employee at the end of a shift. When there are multiple customers and multiple employees working at different shifts, the POS device 100 may determine each payment for each employee by summing corresponding orders and/or generating the results automatically according to shift schedules.

At step 440, the POS device 100 sends a fund transfer message 142 (FIG. 1) to the payment system provider of the owner 132. Upon receiving the request, the payment system provider 132 completes the cash network transaction by transferring funds from the owner's account to the employee's account. As will be appreciated, if the payment system provider 132 is a bank, then some employees may happen to use the same bank as the employer, whereas other employees may use a different bank than the employer. For employees that use the same bank, transferring the funds may likely be as straightforward as making a ledger entry to move the funds from one account to another within the same bank. For employees that use a different bank, transferring the funds may involve use of a payment rail to move the funds from one bank to another. For example, one real-time payment rail that may be used for this purpose is Zelle®, which was initially created by a consortium of banks to in part to facilitate funds transfers between customers of the member banks.

In some embodiments, the payment is sent via payment rails other than payment card networks. For example, the payment may be sent via Zelle, PayPal, Venmo, or intrabank transfer, and not via the Visa or Mastercard networks. Hence, whereas a customer may return a purchased item at a store and a refund transaction may be executed to return the funds used to purchase the item to the customer using the Visa or Mastercard payment card networks, in the present example, the payment made to the employee is not a refund but rather is compensation and is not executed as a refund transaction.

At step 450, upon completion of the payment transaction by the payment system provider 132 (e.g., with other financial institutions or within itself or both), the POS device 100 receives an instant notification confirming that payment has been sent from the owner's account to the employee's account. In some embodiments, the POS device 100 displays the confirmation at a screen of the POS device 100. In other embodiments, the POS device 100 prints the confirmation at a printer of the POS device 100. In yet some other embodiments, the POS forwards an alert electronically, such as via an email or a message, to an electronic device of the employee, such as a smartphone or other mobile device (e.g., smart watch). In yet other embodiments, the alert is transmitted by the payment system provider 132. When the alert is sent, the alert may cause the mobile device of the employee to wake up and emit a noise or vibrate. In this manner, the employee may be alerted that the employee has received a tip from the customer, such that the employee may thank the customer before the customer leaves the merchant.

In some embodiments, funds may be transferred and available to the employee for spending within a few hours or within one hour. In some embodiments, funds may be transferred and available to the employee for spending within ten minutes. In some embodiments, the operation of steps 430 through 450 can be even faster—instant or near instant. For example, the POS device 100 provides a summary button or command to accomplish all three steps 430. The time required for such execution may be limited only by processor speeds and data transfer speeds, such as dependent on specific network technology. In some embodiments, the cash transfer request and completion may be accomplished such that the funds are available for spending by the employee within a few minutes, a few seconds, or even a few milliseconds. As such, neither the employee nor the owner would see a pending status of the cash payment transaction. For example, in a restaurant setting, a waiter or waitress may be able to access and use tips paid by credit cards (or similar payment methods) of customers instantaneously in the same way as actual cash tips. The owner of the POS device 100 also benefits with the relief of burden of accounting, withdrawing, and transferring cash payments at random or unpredictable schedule.

Figure 5:
FIG. 5 is an example transaction record indicating payments made in an example POS instant network cash transfer device.

Referring to FIG. 5, FIG. 5 is an example transaction record indicating payments made in an example POS device 100. In the illustrated example, a customer provides a payment having both cash 520 and with a credit card tip written on the merchant copy 510 (e.g., where two parties are splitting the bill). The server may input the cash amount and scan the merchant copy 510 at the POS device 100. The POS device 100 records the tip amount paid using the credit card. If any of the cash is to be used for a tip, then the employee may retain that amount directly, as would normally be the case.

Figure 6:
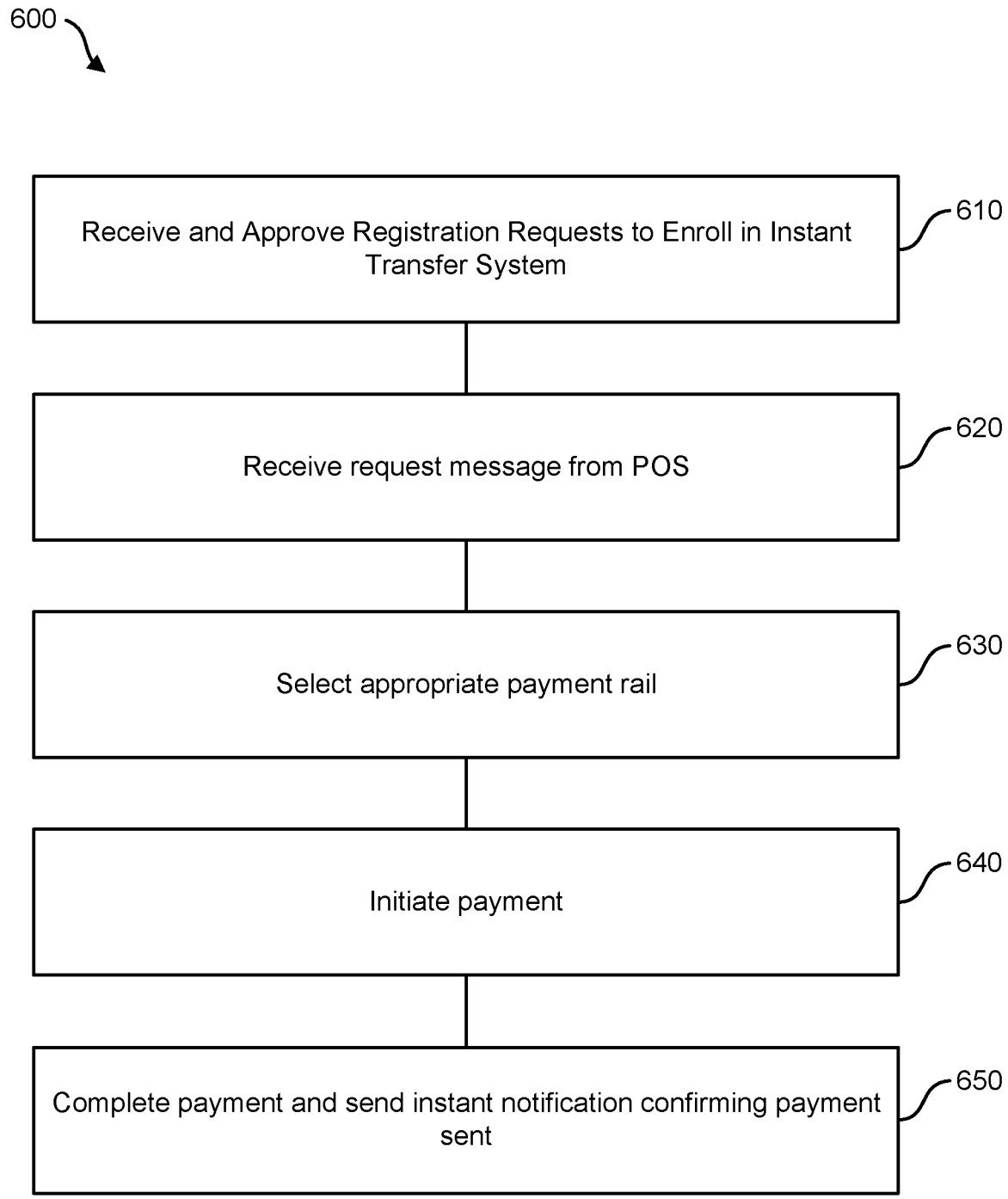
FIG. 6 is a flow chart illustrating operations performed in the payment system provider.

Referring now to FIG. 6, FIG. 6 is a flow chart 600 illustrating operations performed in the payment system provider 132 receiving the fund transfer request from the POS device 100. At step 610, the payment system provider may receive and approve registration requests from new customers or employees for enrollment to the instant cash network transfer system.

At step 620, the payment system provider 132 receives a fund transfer request message 142 from the POS device 100. The payment system provider 132 is operable to verify, decode, and authenticate information contained in the message. For example, in some embodiments, relevant account information may be tokenized, such that only tokens are transmitted and not actual account information. The fund transfer request message 142 may include payment instructions to be implemented by the payment system provider 132 (e.g., the amount of the payment and tokenized account information associated with the employer making the payment and the employee to be paid).

Figure 7:
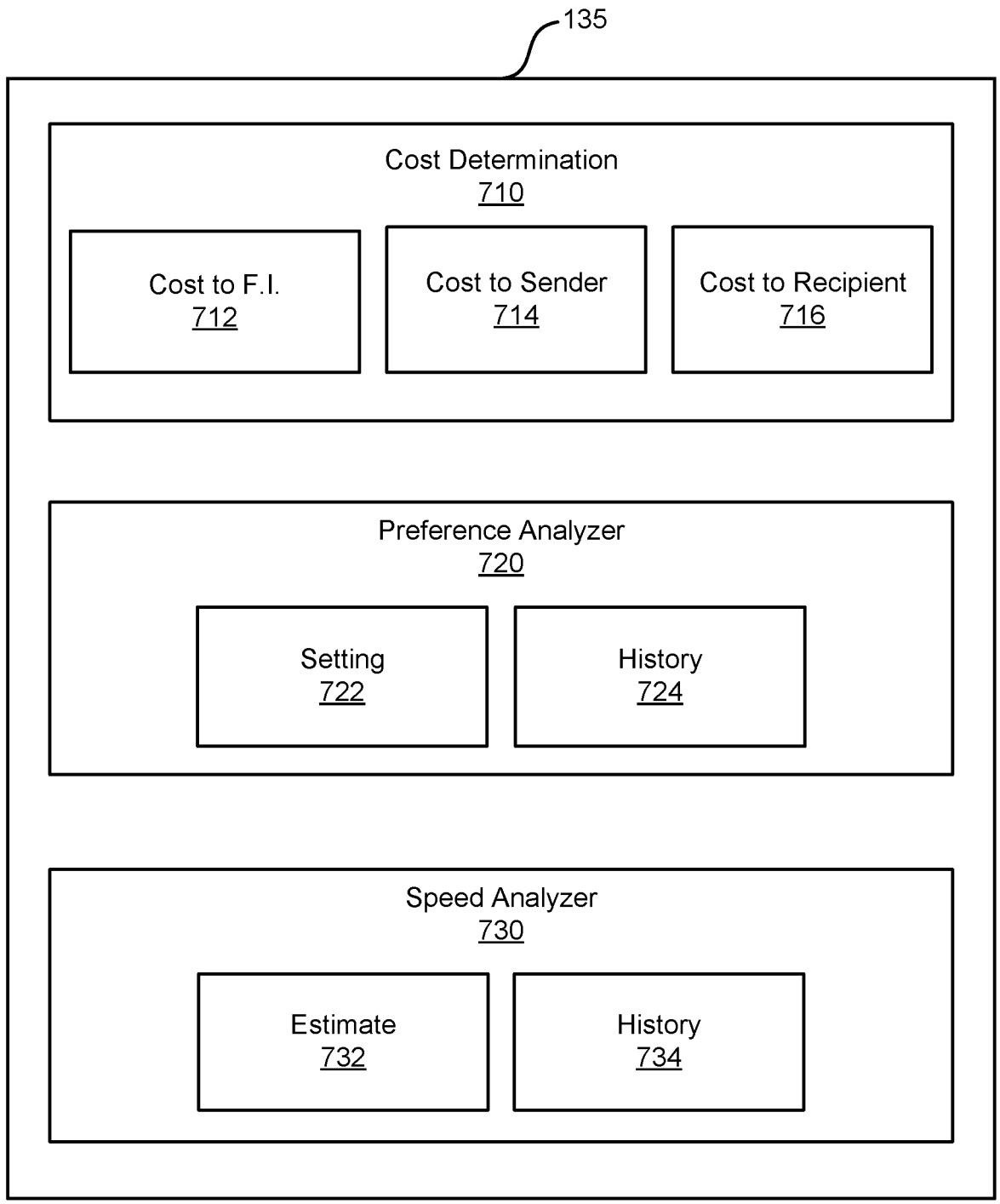
FIG. 7 is a diagram showing the payment rail engine of the payment system provider.

At step 630, the payment system provider 132 may select an appropriate payment rail. As previously noted, in some embodiments the payment rail is selected by the employer or by the payment provider 132 rather than by the employee. The payment rail may be selected based on internal logic by comparing time and costs required to use a payment rail. This step may be accomplished by the payment rail engine 135 as shown in FIG. 1 and FIG. 7. For example, the payment rail engine 135 may record and create a ranking of different payment rail options based on costs, user preferences, availability, speed of settlement, or other criteria. Details are discussed below related to FIG. 7.

Once the payment system provider determines an appropriate payment rail, the payment system provider 132 initiates the payment according to the fund transfer request message at step 640. For example, in the case where the employer and the employee share the same bank, the payment system provider 132 may debit the account of the owner of the POS device 100 and credits the account of the employee receiving the cash tip from the customer. In the scenario where the employer and the employee do not share the same bank, the payment rail selected in step 130 may be utilized. At step 650, the payment system provider completes the cash transfer. The payment system provider completes the transfer and sends a confirmation notification to the POS device 100.

Referring now to FIG. 7, FIG. 7 is a diagram showing the payment rail engine 135 of the payment system provider 132. As shown, the payment rail engine 135 includes a cost determination module 710, a preference analyzer 720, and a speed analyzer 730. Turning first to the cost determination module 710, the cost determination module 710 includes determines and compares the costs of making a payment via a given payment rail to the payment system provider 132. For example, some payment rails may charge extra for real time payment. Furthermore, the cost determination module 710 includes modules 714 and 716 that determine how any such costs would be charged to the sender or recipient.

The preference analyzer 720 may store the user preference or setting in the setting memory 722. The preference analyzer 720 may further include a history memory 724 for keeping a record of past preferences or selections made by the user. In some embodiments, the user may set a priority between cost determination and preference such that one may overwrite the other. For example, the user may select a preferential setting and the setting 722 such that the payment rail engine 135 would execute the payment request based on the preferential setting when available, and thus ignoring cost determination and the cost determination module 710. In some embodiments, a user may select a desired payment rail to be used for all payments (e.g., an employee may prefer to always receive payments via Zelle).

The speed analyzer 730 includes an estimate module 732 and a history module 734. The estimate module 732 may use current or past data to estimate the payment speed for the requested transaction. In some embodiments, the estimate module 732 may run the estimation based on records stored in the history module 734. In some other embodiments, the speed analyzer 730 may select one of the past records stored in the history module 734 as a predictor for the current transaction speed.

Advantageously, the payment system provider 132 uses the payment rail engine and offers multiple payment rails, including internal, zero cost transfers. Such transfers may be referred to as on-us transfers, as discussed above. For example, the payment system provider holds accounts for both the owner of the POS device 100 and the employee the owner is to transfer cash to and therefore the payment system provider may use an internal funds transfer process (e.g., through ledger entries, etc.) to move funds between accounts without using an external funds transfer network, such as ACH. In some embodiments, payment rail options include debit "push to card," ACH batch payment, they'll network transfer, PayPal/Venmo integration, and/or the internal on-us transfer.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

An exemplary system for implementing the overall system or portions of the embodiments might include a general purpose computing devices in the form of computers, including a processing unit, a system memory, and a system bus that couples various system components including the system memory to the processing unit.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments.

Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method comprising:

receiving, by a graphical user interface associated with a software application deployed to a point of sale (POS) system of a merchant, a user input comprising a non-financial account handle associated with a bank account identifier for a first financial account held by the merchant, wherein the non-financial account handle is stored on a storage media associated with the POS system and the bank account identifier is not stored on the storage media associated with the POS system;

receiving, by the graphical user interface of the POS system, payment method information for a customer for a customer payment to the merchant, the customer payment associated with at least one transaction of a plurality of credit card transactions using a first payment rail, wherein the first payment rail is a payment card network;

in response to a completion of a work schedule by an employee of the merchant, automatically analyzing, by the POS system, schedule information for the employee of the merchant to determine one or more time periods where the employee is working;

aggregating, by the POS system, tip amounts from a subset of the plurality of credit card transactions and at least one cash payment associated with the employee based on the schedule information;

receiving, by the POS system, payment instructions, the payment instructions including an amount of funds for a payment to be made by the merchant to the employee based on the aggregate tip amount, wherein a payment system provider computer system is communicatively coupled to the POS system and configured to maintain the first financial account for the merchant; and determining, by the POS system, an optimal payment rail based on comparing multiple payment rail options;

automatically transmitting, by the POS system in real-time, the amount of funds from the first financial account of the merchant to an account of the employee based on the payment instructions via the optimal payment rail, wherein the funds are transferred via an electronic cash deposit being made from the first financial account to a second financial account held by the employee and without a pending status on the first financial account and the second financial account such that the amount of funds are immediately available for use by the employee, wherein the optimal payment rail is an intrabank transfer; and in response to completion of the electronic cash deposit, forwarding, by the POS system, an alert to a mobile device of the employee indicating completion of the electronic cash deposit and availability of the amount of funds, wherein the amount of funds are immediately available to the employee in real-time, and wherein the alert causes the mobile device of the employee to wake up and emit at least one of a noise or vibration.

2. The method of claim 1, wherein the payment is for the tip amount earned by the employee in connection with service provided by the employee to a customer of the merchant.

3. The method of claim 2, wherein the tip amount is an aggregated tip amount that includes multiple tips received over the course of the employee's work shift.

4. The method of claim 2, wherein the alert is received within an amount of time to permit the employee to thank the customer for the tip before the customer leaves the merchant.

5. The method of claim 1, wherein the payment system provider computing system comprises an application programming interface, wherein the payment instructions are received by the application programming interface, wherein the funds are withdrawn from the first financial account maintained for the merchant, and wherein the payment instructions are not transmitted via a payment card network.

6. The method of claim 1, wherein the payment system provider computing system maintains accounts for both the merchant and the employee, and wherein transmitting funds from the account of the merchant to an account of the employee based on the payment instructions comprises making a ledger entry to move the funds from the account of the merchant to the account of the employee.

7. The method of claim 1, further comprising:
receiving, by the graphical user interface, a second non-financial account handle associated with a second bank account identifier for the second financial account held by the employee; and
storing the second non-financial account handle on the storage media associated with the POS system, wherein the second bank account identifier is not stored on the storage media associated with the POS system.

8. The method of claim 1, further comprising transmitting, by the POS system, a separate set of payment instructions after determining that each credit card transaction of the plurality of credit card transactions has been completed.

9. A point of sale (POS) instant payment system comprising:
a plurality of table top terminals, the plurality of table top terminals each including a touch screen display and a payment card reader, the touch screen displaying menu options to a customer and receiving menu selections from the customer, wherein at the end of service to the customer by an employee, the touch screen displays suggested tip amounts based on the menu selections received from the customer and receives a desired tip amount from the customer, and wherein the payment card reader interacts with a credit card of the customer to initiate a credit card payment to a merchant; and a payment system provider computer system configured to:
i) receive, by a graphical user interface associated with a software application deployed to a POS system of the merchant, a user input comprising a non-financial account handle associated with a bank account identifier for a first financial account held by the merchant, wherein the non-financial account handle is stored on a storage media associated with the POS system and the bank account identifier is not stored on the storage media associated with the POS system, ii) receive, by the graphical user interface, payment method information for a customer for a customer payment to the merchant, the customer payment associated with at least one transaction of a plurality of credit card transactions using a first payment rail, wherein the first payment rail is a payment card network, iii) determine an optimal payment rail based on comparing multiple payment rail options, iv) in response to a completion of a work schedule by an employee of the merchant, automatically transmit, in real-time via a second payment rail, a payment comprising an electronic cash deposit to the employee that includes the tip amount, the payment system provider computer system communicatively coupled to the POS system and configured to maintain a first financial account for the merchant associated with the bank account identifier, the first financial account of the merchant being the source of funds for the payment, and v) in response to completion of the electronic cash deposit, forward an alert to a mobile device of the employee indicating completion of the electronic cash deposit and availability of the tip amount, wherein the tip amount is immediately available to the non-customer employee in real-time from transmitting the payment instructions via the optimal payment rail, and wherein the alert causes the mobile device of the employee to wake up and emit at least one of a noise or vibration, wherein:

the funds are transferred via the electronic cash deposit being made from the first financial account to a second financial account associated with the employee and without a pending status on the first financial account or the second financial account such that the amount of funds are immediately available for use by the employee, wherein the second payment rail is an intrabank transfer.

10. The system of claim 9, wherein the alert is received within an amount of time to permit the employee to thank the customer from the tip before the customer leaves the merchant.

11. The system of claim 9, wherein the tip amount is an aggregated tip amount that includes multiple tips received over the course of the employee's work shift.

12. The system of claim 9, wherein the funds are available to the employee within a few minutes of receiving the table top terminal receiving the desired tip amount.

* * * * *